(12) United States Patent
Blanchet-Fincher

(10) Patent No.: US 7,033,525 B2
(45) Date of Patent: Apr. 25, 2006

(54) HIGH CONDUCTIVITY POLYANILINE COMPOSITIONS AND USES THEREFOR

(75) Inventor: Graciela Beatriz Blanchet-Fincher, Greenville, DE (US)

(73) Assignee: E.I. duPont de Nemours and Company, Wilmington, DE (US)

( * ) Notice: Subject to any disclaimer, the term of this patent is extended or adjusted under 35 U.S.C. 154(b) by 178 days.

(21) Appl. No.: 10/250,962

(22) PCT Filed: Feb. 12, 2002

(86) PCT No.: PCT/US02/05486

§ 371 (c)(1),
(2), (4) Date: Jul. 9, 2003

(87) PCT Pub. No.: WO02/080195

PCT Pub. Date: Oct. 10, 2002

(65) Prior Publication Data

US 2004/0065970 A1 Apr. 8, 2004

Related U.S. Application Data

(60) Provisional application No. 60/269,536, filed on Feb. 16, 2001.

(51) Int. Cl.
*H01B 1/04* (2006.01)
(52) U.S. Cl. .................... 252/502; 428/901
(58) Field of Classification Search ............. 252/502; 428/408, 901; 423/445 R
See application file for complete search history.

(56) References Cited

U.S. PATENT DOCUMENTS

| 0,127,747 A | 6/1872 | Donnelly |
| 0,174,590 A | 3/1876 | Tesseyman |
| 0,227,319 A | 5/1880 | Tegnander |
| 0,344,593 A | 6/1886 | Peabody |
| 0,349,775 A | 7/1886 | Wood |
| 0,367,029 A | 7/1887 | Esty |
| 0,571,129 A | 11/1896 | Schumacher |
| 0,574,762 A | 1/1897 | Rowbotham |
| 0,593,248 A | 11/1897 | Smith |
| 0,600,971 A | 3/1898 | Singer |
| 0,657,409 A | 9/1900 | Gould |
| 0,669,234 A | 3/1901 | Fuhrmann et al. |
| 0,697,649 A | 4/1902 | McLean |
| 0,706,320 A | 8/1902 | Jenney |
| 0,706,494 A | 8/1902 | Minogue |
| 0,749,864 A | 1/1904 | James |
| 0,766,410 A | 8/1904 | Alger |
| 0,771,037 A | 9/1904 | Beck |
| 0,782,597 A | 2/1905 | Cheshire |
| 0,815,911 A | 3/1906 | Eddy |
| 0,818,609 A | 4/1906 | Butikofer |
| 0,839,300 A | 12/1906 | Krohn |

(Continued)

FOREIGN PATENT DOCUMENTS

WO    WO 00/73203    12/2000

OTHER PUBLICATIONS

Deng "Hybrid Composite of Polyaniline Containing Carbon Nanotube", Chinese Chem. Lett, vol. 12, No. 11, pp 1037-1040. 2001.*

(Continued)

*Primary Examiner*—Mark Kopec

(57) ABSTRACT

The present invention describes compositions formed from polyanaline and carbon nanotubes, which exhibit enhanced conductivity and which provide uses in electronic circuit applications.

3 Claims, 2 Drawing Sheets

U.S. PATENT DOCUMENTS

| | | |
|---|---|---|
| 0,848,665 A | 4/1907 | Lombard |
| 0,850,295 A | 4/1907 | Chappell |
| 0,851,293 A | 4/1907 | Lehberger |
| 0,868,497 A | 10/1907 | Smith |
| 0,893,038 A | 7/1908 | Vadam |
| 0,893,181 A | 7/1908 | Macomber |
| 0,897,963 A | 9/1908 | Clayton et al. |
| 0,928,715 A | 7/1909 | Thurber |
| 0,933,316 A | 9/1909 | Macomber |
| 0,945,232 A | 1/1910 | Harding |
| 0,947,008 A | 1/1910 | Williams et al. |
| 0,968,969 A | 8/1910 | Ord |
| 0,972,966 A | 10/1910 | Williams |
| 0,980,491 A | 1/1911 | Coleman |
| 0,998,363 A | 7/1911 | De Lukacsevics |
| 0,999,047 A | 7/1911 | Lehberger |
| 1,033,701 A | 7/1912 | Lochum |
| 1,038,537 A | 9/1912 | Dexter |
| 1,042,018 A | 10/1912 | Macomber |
| 1,050,456 A | 1/1913 | Helin |
| 1,053,799 A | 2/1913 | Eslick |
| 1,063,456 A | 6/1913 | Looney |
| 1,065,604 A | 6/1913 | Gray |
| 1,076,179 A | 10/1913 | Whitehead |
| 1,076,807 A | 10/1913 | Anderson |
| 1,080,123 A | 12/1913 | Pratt |
| 1,087,861 A | 2/1914 | Alexander et al. |
| 1,097,150 A | 5/1914 | Vallez |
| 1,104,539 A | 7/1914 | Ord |
| 1,132,161 A | 3/1915 | Cassady et al. |
| 1,132,581 A | 3/1915 | Hein |
| 1,136,363 A | 4/1915 | Pepper |
| 1,142,367 A | 6/1915 | Reiche |
| 1,147,313 A | 7/1915 | Desort |
| 1,170,918 A | 2/1916 | Lundy |
| 1,177,126 A | 3/1916 | Miller |
| 1,177,609 A | 4/1916 | Edwards |
| 1,181,463 A | 5/1916 | La Fontaine |
| 1,183,470 A | 5/1916 | Lee |
| 1,183,777 A | 5/1916 | Soules |
| 1,189,477 A | 7/1916 | Peytoureau |
| 1,202,598 A | 10/1916 | Simpson |
| 1,204,892 A | 11/1916 | Macomber |
| 1,206,800 A | 12/1916 | Batt |
| 1,207,846 A | 12/1916 | Bradford |
| 1,209,995 A | 12/1916 | Ord |
| 1,215,434 A | 2/1917 | Trebert |
| 1,219,377 A | 3/1917 | Davidson |
| 1,222,475 A | 4/1917 | Sears |
| 1,226,789 A | 5/1917 | Macomber |
| 1,228,101 A | 5/1917 | Dutton |
| 1,229,009 A | 6/1917 | Allison |
| 1,250,709 A | 12/1917 | Tanner |
| 1,252,436 A | 1/1918 | Hickey |
| 1,255,664 A | 2/1918 | Syger |
| 1,256,382 A | 2/1918 | Scott |
| 1,261,111 A | 4/1918 | Fasey et al. |
| 1,275,494 A | 8/1918 | Storle |
| 1,276,346 A | 8/1918 | Gould |
| 1,277,964 A | 9/1918 | Lovelace |
| 1,282,179 A | 10/1918 | Brackett |
| 1,282,180 A | 10/1918 | Brackett |
| 1,283,575 A | 11/1918 | Shepard |
| 1,289,424 A | 12/1918 | Faupel |
| 1,291,531 A | 1/1919 | James et al. |
| 1,293,733 A | 2/1919 | Duby |
| 1,298,191 A | 3/1919 | Fasey |
| 1,307,045 A | 6/1919 | Galbreath |
| 1,312,234 A | 8/1919 | Carlson |
| 1,313,569 A | 8/1919 | Wilks et al. |
| 1,316,679 A | 9/1919 | Brackett |
| 1,321,045 A | 11/1919 | Hutchinson |
| 1,321,046 A | 11/1919 | Hutchinson |
| 1,324,520 A | 12/1919 | Robbins |
| 1,324,534 A | 12/1919 | Ambrose |
| 1,328,261 A | 1/1920 | Blankenburg |
| 1,332,756 A | 3/1920 | Root |
| 1,332,948 A | 3/1920 | Murphy |
| 1,338,039 A | 4/1920 | Porter |
| 1,338,185 A | 4/1920 | Looney |
| 1,339,276 A | 5/1920 | Murphy |
| 1,345,808 A | 7/1920 | Reynolds |
| 1,345,940 A | 7/1920 | Looney |
| 1,347,762 A | 7/1920 | Shepard |
| 1,348,371 A | 8/1920 | Murphy |
| 1,364,256 A | 1/1921 | Des Engants et al. |
| 1,366,636 A | 1/1921 | Conway |
| 1,370,856 A | 3/1921 | Thomson |
| 1,374,315 A | 4/1921 | Murphy |
| 1,374,915 A | 4/1921 | Fasey |
| 1,375,140 A | 4/1921 | Fasey |
| 1,377,383 A | 5/1921 | Bair |
| 1,377,899 A | 5/1921 | De Lukacsevics et al. |
| 1,379,774 A | 5/1921 | Murphy |
| 1,379,775 A | 5/1921 | Murphy |
| 1,382,485 A | 6/1921 | Lukacsevics |
| 1,384,344 A | 7/1921 | Powell |
| 1,389,873 A | 9/1921 | Hult |
| 1,389,967 A | 9/1921 | Murphy |
| 1,390,034 A | 9/1921 | Howard |
| 1,393,174 A | 10/1921 | Shepard |
| 1,405,224 A | 1/1922 | Kenmonth |
| 1,407,293 A | 2/1922 | Mott |
| 1,408,385 A | 2/1922 | Newton |
| 1,413,363 A | 4/1922 | Smith et al. |
| 1,427,632 A | 8/1922 | Pryor |
| 1,445,686 A | 2/1923 | Hult |
| 1,466,144 A | 8/1923 | Murphy |
| 1,466,276 A | 8/1923 | Egersdorfer |
| 1,476,307 A | 12/1923 | Toth |
| 1,487,338 A | 3/1924 | Kelley |
| 1,492,215 A | 4/1924 | Nedoma |
| 1,503,741 A | 8/1924 | Almen |
| 1,508,623 A | 9/1924 | Somervell |
| 1,529,687 A | 3/1925 | Bowen |
| 1,544,382 A | 6/1925 | Entler |
| 1,545,925 A | 7/1925 | Powell |
| 1,549,556 A | 8/1925 | Kennedy |
| 1,556,300 A | 10/1925 | Olsen |
| 1,565,184 A | 12/1925 | Miller |
| 1,568,378 A | 1/1926 | Gribojedoff |
| 1,569,525 A | 1/1926 | Owens |
| 1,604,474 A | 10/1926 | Nisbet |
| 1,610,060 A | 12/1926 | Lind |
| 1,614,476 A | 1/1927 | Hutchinson |
| 1,622,986 A | 3/1927 | Weingartner |
| 1,625,841 A | 4/1927 | Wright |
| 1,628,100 A | 5/1927 | Bacon |
| 1,629,686 A | 5/1927 | Dreisbach |
| 1,655,738 A | 1/1928 | Rasck |
| 1,661,582 A | 3/1928 | Szydlowski |
| 1,664,086 A | 3/1928 | Olsen |
| 1,673,632 A | 6/1928 | Mattson |
| 1,675,629 A | 7/1928 | Andrews |
| 1,693,024 A | 11/1928 | Drummond |
| 1,696,676 A | 12/1928 | Fuhr |
| RE17,273 E | 4/1929 | Michell |
| 1,707,779 A | 4/1929 | Atkeson |
| 1,716,621 A | 6/1929 | Cizek |
| 1,717,999 A | 6/1929 | Olsen |
| 1,736,507 A | 11/1929 | Peterson |
| 1,738,512 A | 12/1929 | Andrews |
| 1,745,821 A | 2/1930 | Gribojedoff |
| 1,757,778 A | 5/1930 | Mehlum |

| Patent No. | Date | Name | Class |
|---|---|---|---|
| 1,762,650 A | 6/1930 | Boughton | |
| 1,770,311 A | 7/1930 | Keith | |
| 1,772,531 A | 8/1930 | Williams | |
| 1,772,977 A | 8/1930 | Arrighi | |
| 1,774,713 A | 9/1930 | Jahn et al. | |
| 1,779,032 A | 10/1930 | Cathcart | |
| 1,788,140 A | 1/1931 | Woolson | |
| 1,788,259 A | 1/1931 | Ward et al. | |
| 1,793,107 A | 2/1931 | Livingston | |
| 1,796,453 A | 3/1931 | Goehler | |
| 1,798,866 A | 3/1931 | Bleser | |
| 1,799,772 A | 4/1931 | Wormley | |
| 1,804,598 A | 5/1931 | Earl | |
| 1,807,087 A | 5/1931 | Finke | |
| 1,808,083 A | 6/1931 | Tibbetts | |
| 1,810,017 A | 6/1931 | Houston | |
| 1,813,259 A | 7/1931 | Schick | |
| 1,828,353 A | 10/1931 | Bleser | |
| 1,838,974 A | 12/1931 | Williams | |
| 1,839,592 A | 1/1932 | Reynolds | |
| 1,846,961 A | 2/1932 | Greening et al. | |
| 1,851,416 A | 3/1932 | Bauer | |
| 1,857,000 A | 5/1932 | Kleschka | |
| 1,864,248 A | 6/1932 | Holmes | |
| 1,866,398 A | 7/1932 | Craig | |
| 1,867,504 A | 7/1932 | Franklin | |
| 1,871,973 A | 8/1932 | Finke | |
| 1,876,506 A | 9/1932 | Lee | |
| 1,878,767 A | 9/1932 | Freund | |
| 1,880,224 A | 10/1932 | Wilsey | |
| 1,885,492 A | 11/1932 | Trew | |
| 2,243,817 A | 5/1941 | Herrmann | |
| 2,368,444 A | 1/1945 | Blanding | |
| 2,369,002 A | 2/1945 | Allison | |
| 2,382,280 A | 8/1945 | Allison | |
| 2,384,292 A | 9/1945 | Feroy | |
| 2,399,743 A | 5/1946 | Kahl | |
| 2,401,466 A | 6/1946 | Davis et al. | |
| 2,406,292 A | 8/1946 | Hall | |
| 2,409,868 A | 10/1946 | Kahl | |
| 2,417,487 A | 3/1947 | Hall | |
| 2,439,265 A | 4/1948 | Schroeder | |
| 2,444,764 A | 7/1948 | Baker | |
| 2,447,314 A | 8/1948 | Carroll | |
| 2,456,164 A | 12/1948 | Youhouse | |
| 2,477,542 A | 7/1949 | Lane | 74/57 |
| 2,512,265 A | 6/1950 | Brigaudet | 123/43 |
| 2,556,585 A | 6/1951 | Jarvinen | 123/43 |
| 2,567,576 A | 9/1951 | Palumbo | 74/56 |
| 2,622,567 A | 12/1952 | Myard | 121/101 |
| 2,647,363 A | 8/1953 | Scott | 60/13 |
| 2,650,676 A | 9/1953 | Jamotte | 184/6 |
| 2,664,866 A | 1/1954 | Fulke | |
| 2,767,589 A | 10/1956 | Redrup et al. | 74/57 |
| 2,770,140 A | 11/1956 | Palumbo | 74/56 |
| 2,770,224 A | 11/1956 | Ericson | 123/48 |
| 2,770,225 A | 11/1956 | Palumbo | 123/58 |
| 2,776,649 A | 1/1957 | Fenske | 123/51 |
| 2,781,749 A | 2/1957 | Stucke | 123/51 |
| 2,783,751 A | 3/1957 | Karlan | 123/58 |
| 2,856,781 A | 10/1958 | Forbes | 74/56 |
| 2,875,701 A | 3/1959 | Ebert | 103/162 |
| 2,949,100 A | 8/1960 | Peterson | 123/43 |
| 2,962,008 A | 11/1960 | Hopkins | 123/45 |
| 2,966,899 A | 1/1961 | Herrmann | 123/58 |
| 2,983,265 A | 5/1961 | Herrmann | 123/58 |
| 2,994,188 A | 8/1961 | Howard | 60/13 |
| 3,039,676 A | 6/1962 | Mikina | 230/173 |
| 3,040,721 A | 6/1962 | Schotthoefer | 123/47 |
| 3,068,709 A | 12/1962 | Peterson | 74/57 |
| 3,078,832 A | 2/1963 | Braine | 123/41.65 |
| 3,107,541 A | 10/1963 | Parsus | 74/57 |
| 3,126,835 A | 3/1964 | Kline | 103/162 |
| 3,169,514 A | 2/1965 | Girodin | 123/58 |
| 3,170,444 A | 2/1965 | Haddon | 123/41.34 |
| 3,182,644 A | 5/1965 | Drtina | 123/58 |
| 3,202,141 A | 8/1965 | Lovell | 123/1 |
| 3,306,269 A | 2/1967 | Dimmock, Jr. | 123/15 |
| 3,326,193 A | 6/1967 | Wahlmark | 123/43 |
| 3,333,577 A | 8/1967 | Mongitore | 123/18 |
| 3,359,864 A | 12/1967 | Hamlin | 91/175 |
| 3,385,051 A | 5/1968 | Kelly | 60/24 |
| 3,396,709 A | 8/1968 | Robicheaux | 123/45 |
| 3,403,668 A | 10/1968 | Schottler | 123/197 |
| 3,407,593 A | 10/1968 | Kelly | 60/24 |
| 3,408,898 A | 11/1968 | Hamlin | |
| 3,456,630 A | 7/1969 | Karlan | 123/58 |
| 3,570,463 A | 3/1971 | Nelson | 123/122 |
| 3,587,638 A | 6/1971 | Poole | 123/45 |
| 3,598,095 A | 8/1971 | Odawara | 123/58 |
| 3,626,911 A | 12/1971 | Shaw | 123/45 |
| 3,654,906 A | 4/1972 | Alras | 123/45 |
| 3,673,991 A | 7/1972 | Winn | 123/58 |
| 3,687,117 A | 8/1972 | Panariti | 123/43 |
| 3,695,237 A | 10/1972 | Londo | 123/43 |
| 3,745,887 A | 7/1973 | Striegl | 92/146 |
| 3,745,981 A | 7/1973 | Warner | 123/58 |
| 3,786,790 A | 1/1974 | Plevyak | 123/58 |
| 3,805,749 A | 4/1974 | Karlan | 123/58 |
| 3,807,370 A | 4/1974 | Baugh | 123/43 |
| 3,828,741 A | 8/1974 | Bixier | 123/58 |
| 3,830,208 A | 8/1974 | Turner | 123/43 |
| 3,844,258 A | 10/1974 | Howell | 123/43 |
| 3,854,284 A | 12/1974 | Denker | 60/39.61 |
| 3,895,614 A | 7/1975 | Bailey | 123/67 |
| 3,899,880 A | 8/1975 | Rohs | 60/39.61 |
| 3,902,466 A | 9/1975 | Gulko | 123/43 |
| 3,902,468 A | 9/1975 | Turner | 123/43 |
| 3,905,338 A | 9/1975 | Turner | 123/43 |
| 3,913,534 A | 10/1975 | Bratten | 123/8.49 |
| 3,923,018 A | 12/1975 | Markowitz | 123/43 |
| 3,929,107 A | 12/1975 | Renger | 123/32 |
| 3,939,809 A | 2/1976 | Rohs | 123/58 |
| 3,943,895 A | 3/1976 | Howell | 123/58 |
| 3,945,359 A | 3/1976 | Asaga | 123/58 |
| 3,968,776 A | 7/1976 | Rund | 123/43 |
| 3,970,055 A | 7/1976 | Long | 123/43 |
| 3,973,531 A | 8/1976 | Turner | 123/43 |
| 4,022,167 A | 5/1977 | Kristiansen | 123/43 |
| 4,022,168 A | 5/1977 | Sprague | 123/43 |
| 4,023,542 A | 5/1977 | Ango | 123/58 |
| 4,060,060 A | 11/1977 | Turner | 123/43 |
| 4,084,555 A | 4/1978 | Outlaw | 123/58 |
| 4,127,096 A | 11/1978 | Townsend | 123/41.56 |
| 4,129,101 A | 12/1978 | Townsend | 123/41.56 |
| 4,138,930 A | 2/1979 | Searle | 92/70 |
| 4,149,498 A | 4/1979 | Ferrell | 123/58 |
| 4,157,079 A | 6/1979 | Kristiansen | 123/43 |
| 4,185,508 A | 1/1980 | Hardt | 74/53 |
| 4,195,600 A | 4/1980 | Shingai | 123/73 |
| 4,213,427 A | 7/1980 | Di Stefano | 123/43 |
| 4,219,001 A | 8/1980 | Kumagai et al. | 123/169 |
| 4,250,843 A | 2/1981 | Chang | 123/43 |
| RE30,565 E | 4/1981 | Kristiansen | |
| 4,287,858 A | 9/1981 | Anzalone | 123/43 |
| 4,363,294 A | 12/1982 | Searle | 123/43 |
| 4,366,784 A | 1/1983 | Paul | 123/45 |
| 4,418,656 A | 12/1983 | Stanton | 123/58 |
| 4,453,508 A | 6/1984 | Groeger | 123/193 |
| 4,492,188 A | 1/1985 | Palmer et al. | 123/58 |
| 4,502,427 A | 3/1985 | Brille | 123/90.41 |
| 4,510,894 A | 4/1985 | Williams | 123/48 |
| 4,520,765 A | 6/1985 | Gerace | 123/27 |
| 4,553,508 A | 11/1985 | Stinebaugh | 123/58 |
| 4,565,165 A | 1/1986 | Papanicolaou | 123/51 |
| 4,571,946 A | 2/1986 | Demopoulos | 60/618 |

| | | | |
|---|---|---|---|
| 4,592,309 A | 6/1986 | Williams | 123/39 |
| 4,610,223 A | 9/1986 | Karian | 123/58 |
| 4,632,081 A | 12/1986 | Giuliani et al. | 123/198 |
| 4,635,590 A | 1/1987 | Gerace | 123/27 |
| 4,648,358 A | 3/1987 | Sullivan et al. | 123/43 |
| 4,768,481 A | 9/1988 | Wood | 123/254 |
| 4,834,033 A | 5/1989 | Larsen | 123/58 |
| 4,867,107 A | 9/1989 | Sullivan et al. | 123/43 |
| 4,867,121 A | 9/1989 | Bivona et al. | 123/197 |
| 4,915,064 A | 4/1990 | Mannerstedt et al. | 123/58 |
| 4,960,082 A | 10/1990 | Sullivan et al. | 123/43 |
| 4,974,555 A | 12/1990 | Hoogenboom | 123/56 |
| 4,974,556 A | 12/1990 | Royse | 123/58 |
| 4,996,953 A | 3/1991 | Buck | 123/58 |
| 5,009,198 A | 4/1991 | Sullivan et al. | 123/43 |
| 5,014,653 A | 5/1991 | Sullivan et al. | 123/43 |
| 5,016,580 A | 5/1991 | Gassman | 123/58 |
| 5,029,558 A | 7/1991 | Sullivan | 123/43 |
| 5,069,820 A | 12/1991 | Jen et al. | |
| 5,070,825 A | 12/1991 | Morgan | 123/43 |
| 5,083,532 A | 1/1992 | Wiesen | 123/58 |
| 5,103,778 A | 4/1992 | Usich, Jr. | 123/58 |
| 5,140,953 A | 8/1992 | Fogelberg | 123/58 |
| 5,159,902 A | 11/1992 | Grimm | 123/43 |
| 5,209,190 A | 5/1993 | Paul | 123/43 |
| 5,218,933 A | 6/1993 | Ehrlich | 123/56 |
| 5,228,415 A | 7/1993 | Williams | 123/51 |
| 5,322,042 A | 6/1994 | di Priolo et al. | 123/263 |
| 5,323,738 A | 6/1994 | Morse | 123/43 |
| 5,329,893 A | 7/1994 | Drangel et al. | 123/78 |
| 5,351,657 A | 10/1994 | Buck | 123/43 |
| 5,375,567 A | 12/1994 | Lowi, Jr. | 123/56.8 |
| 5,437,251 A | 8/1995 | Anglim et al. | 123/56.3 |
| 5,443,043 A | 8/1995 | Nilsson et al. | 123/48 |
| 5,452,689 A | 9/1995 | Karlan | 123/56.2 |
| 5,456,220 A | 10/1995 | Candler | 123/43 |
| 5,467,757 A | 11/1995 | Yanagihara et al. | 123/305 |
| 5,476,072 A | 12/1995 | Guy | 123/48 |
| 5,507,253 A | 4/1996 | Lowi, Jr. | 123/56.9 |
| 5,517,953 A | 5/1996 | Wiesen | 123/51 |
| 5,535,716 A | 7/1996 | Sato et al. | 123/279 |
| 5,551,383 A | 9/1996 | Novotny | 123/51 |
| 5,566,578 A | 10/1996 | Rose | 74/57 |
| 5,636,561 A | 6/1997 | Pecorari | 91/499 |
| 5,647,308 A | 7/1997 | Biagini | 123/56.2 |
| 5,704,332 A | 1/1998 | Motakef | 123/225 |
| 5,743,220 A | 4/1998 | Guarner-Lans | 123/56.9 |
| 5,749,337 A | 5/1998 | Palatov | 123/56.2 |
| 5,762,039 A | 6/1998 | Gonzalez | 123/197.3 |
| 5,765,512 A | 6/1998 | Fraser | 123/54.1 |
| 5,799,629 A | 9/1998 | Lowi, Jr. | 123/56.8 |
| 5,813,372 A | 9/1998 | Manthey | 123/43 |
| 5,832,880 A | 11/1998 | Dickey | 123/25 |
| 5,875,743 A | 3/1999 | Dickey | 123/25 |
| 5,890,462 A | 4/1999 | Bassett | 123/56.2 |
| 5,894,820 A | 4/1999 | Baeta | 123/56.1 |
| 5,904,044 A | 5/1999 | White | 60/443 |
| 5,950,580 A | 9/1999 | Birckbichler | 123/56.2 |
| 5,992,357 A | 11/1999 | Tasi | 123/56.2 |
| 6,003,480 A | 12/1999 | Quayle et al. | 123/56.1 |
| 6,089,195 A | 7/2000 | Lowi, Jr. | 123/53.6 |
| 6,092,512 A | 7/2000 | Ma | 123/568.15 |
| 6,260,520 B1 | 7/2001 | Van Reatherford | 123/48 |
| 6,703,163 B1 * | 3/2004 | Ogura et al. | 429/218.1 |

OTHER PUBLICATIONS

Cochet et al "Synthesis of new polyaniline/nanotube composite . . . ", Chem. Comm. 2001, 1450-1451.*

Zengin et al "Carbon Nanotube Doped Polyaniline", Advance Materials, 2002, 14(20). Abstract Only.*

PCT/US02/05486, International Search Report dated Aug. 13, 2002.

Christine Downs et al., Efficient Polymerization of Aniline at Carbon Nanotube Electrodes, Adv. Mater. 1999, 11, No. 12.

J. N. Coleman et al., Percolation-dominated conductivity in a conjugated-polymer-carbon-nanotube composite, Physical Review, v. 58, No. 12, 1998.

Katsumi Yoshino et al., Electrical and Optical Properties of Conducting Polymer-Fullerene and Conducting Polymer-Carbon Nanotube Composites, Fullerene Science and Technology, 7(4), 695-711, 1999.

Jin-Chih Chiang et al., "Polyaniline": Protonic Acid Doping of the Emeraldine form to the Metallic Regime, Synthetic Metals, 13, 193-205, 1986.

K. Levon et al., Thermal doping of polyaniline with dodecylbenzene sulfonic acid without auxiliary solvents, Polymer, v. 36, No. 14, 2733-2738, 1995.

O. T. Ikkalaa et al., Phase behavior of polyaniline/dodecyl benzene sulphonic acid mixture, Synthetic Metals 69, 135-136, 1995.

George Z. Chen et al., Carbon Nanotube and Polypyrrole Composites: Coating and Doping, Adv. Mater. 12, No. 7, 2000.

US 6,019,073, 02/2000, Sanderson (withdrawn)

* cited by examiner

HIGH CONDUCTIVITY POLYANILINE COMPOSITIONS AND USES THEREFOR

This application claims the benefit of Provisional Application No. 60/269,536, filed Feb. 16, 2001.

FIELD OF THE INVENTION

The present invention describes compositions formed from polyanaline and carbon nanotubes, which exhibit enhanced conductivity and provide high utility in novel applications in electronic circuits.

TECHNICAL BACKGROUND OF THE INVENTION

Conductive polymers have long been known in the art, including polyacetylene, polypyrrole, poly(para-phenylene), and derivatives thereof. While in some cases exhibiting metallic-like conductivity, highly conductive polymers have been limited in their practical applications because they are typically chemically unstable in use, and virtually intractable, being unsuited for either solution or melt processing. All conductive polymers require acid or oxide functionality, usually referred to as doping, to achieve their high conductivities.

Polyaniline (PANI) stands out among conductive polymers in that it is known in the art to be chemically stable and readily soluble in conventional, environmentally friendly solvents, and thus offers the possibility for employing ordinary means known in the art forming coatings, films and sheets, fibers, printed patterns, and so forth.

Conductive PANI is described in great detail in Chiang et al, *Synthetic Metals,* 13 (1986), pp. 193–205. Chiang et al disclose numerous PANI compositions, identifying the protonic acid doped emeraldine nitrogen base salt, as the most highly conductive form, with a conductivity of 5 S/cm. This conductivity remains well below the $10^2$ S/cm range characteristic of certain other conductive polymers, and which represents practical threshold conductivity for widespread utility in electronics.

Levon et al, *Polymer* 36, pp 2733ff (1995) and Ahiskog et al, *Synthetic Metals,* 69, pp 135ff (1995) disclose formation of the PANI nitrogen base salt at elevated temperature by combining with liquid organic acids such as dodecylbenzenesulfonic acid (DBSA).

There is considerable incentive to find a way to enhance the conductivity of PANI while preserving the desirable chemical stability and processibility thereof. Specifically, a PANI composition exhibiting a conductivity of ca. $10^2$ S/cm may be a highly preferred material for important applications in electronics.

It is known in the art to combine PANI with inorganic fillers, including conductive fillers such as graphite, metal fibers, and superconducting ceramics, see for example Jen et al, U.S. Pat. No. 5,069,820.

Carbon nanotubes are a relatively new form of matter related to $C_{60}$ the spherical material known popularly as "Buckminster Fullerene" While new, carbon nanotubes have elicited much interest because of their unusual structure and are available commercially. They are described in considerable detail in *Carbon Nanotubes and Related Structures,* by Peter J. F. Harris, Cambridge University Press, Cambridge, UK (1999).

Composites of conductive polymers and carbon nanotubes in the form of films are disclosed in Coleman et al, *Phys. Rev.* B 58 (12) R7492ff (1998), Chen et al, *Advanced Materials* 12 (7) 522 ff (2000), and Yoshino et al, *Fullerene Sci. Tech.* 7 (4) 695ff (1999).

Coleman et al, op. cit. discloses composites of poly(p-phenylenevinylene-co-2,5dioctoxy-m-phenylenevinylene) (PMPV) with carbon nanotubes produced by an electric arc procedure. Mass fractions of nanotubes plus residual soot ranged from ca. 0.5–35%. Films were spin-coated onto a platinum surface from a toluene solution. Conductivity is shown to exhibit a six order of magnitude increase between ca. 4% and ca 9% nanotubes.

Also disclosed in Coleman et al, op. cit., is a failed attempt to make a similar composite with PMMA. The failure is said to result from molecular conformational causes.

Chen et al, op. cit., disclose composite films of nanotubes and polypyrrole. Both films and coated nanotubes are disclosed. The nanotubes are shown to enhance the conductivity of the polypyrrole. The films are deposited by exposing various substrates to a solution of pyrrole and nanotubes followed by electropolymerization of the pyrrole in situ on the substrate, thus entrapping the nanotubes within the polymer matrix. Chen also employs arc-grown nanotubes.

Yoshino et al, op. cit., disclose composites of poly(3-hexylthiophene) (PAT6) and nanotubes produced by chemical vapor deposition and purified. The nanotubes were dispersed in hexene and mixed with the chloroform solution of the polymer. Films were formed by casting on a quartz plate. A ca. 4 order of magnitude change in conductivity was observed between a volume fraction of ca. 1% to ca. 10%, with the percolation threshold estimated to be at ca. 5.9%.

Laser thermal ablation image transfer technology for color proofing and printing is described in Ellis et al, U.S. Pat. No. 5,171,650 and elsewhere. Similar methods are in current commercial use in the printing and publishing businesses.

SUMMARY OF THE INVENTION

The present invention provides for a composition comprising a nitrogen base salt derivative of emeraldine polyaniline and carbon nanotubes.

The present invention further provides for electronic circuits comprising conductive pathways of a nitrogen base salt derivative of emeraldine polyaniline and carbon nanotubes.

The present invention further provides for a process for depositing conductive pathways from a donor element onto a receiver substrate contiguous with the donor element, wherein the donor element is a layered structure comprising a support layer capable of partially absorbing laser radiation, one or more heating layers, and an imaging topcoat transfer layer, and, optionally, an ejection layer, the process comprising:
  (a) exposing said support layer to incident laser energy;
  (b) converting said laser energy to heat in said one or more heating layer(s) that is (are) contiguous with the topcoat that absorbs said laser energy;
  (c) said heat applied to said topcoat being sufficient to effect a transfer of at least a portion of said topcoat to a receiving surface;
  wherein the topcoat is a conductive PANI/nanotube composite.

DETAILED DESCRIPTION

Figure 1:
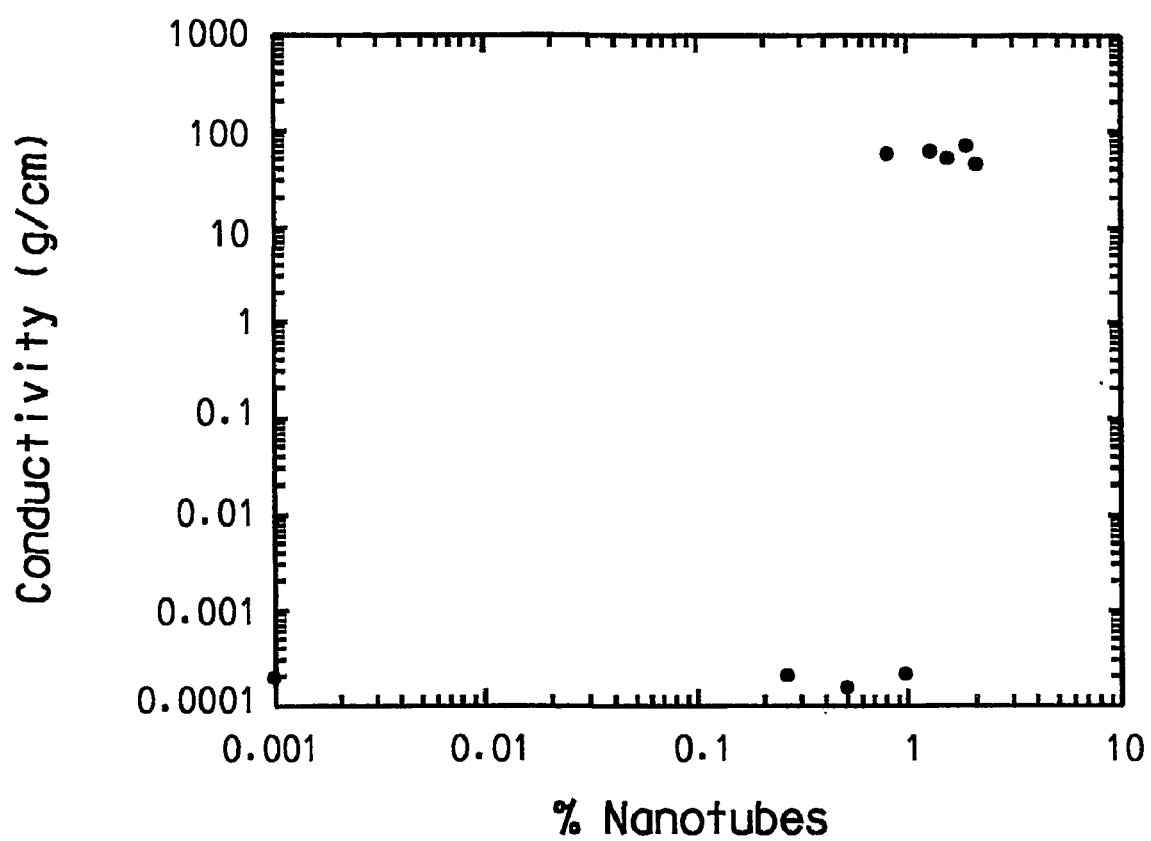
FIG. 1 shows a schematic of the laser deposition apparatus used to form electronically conductive pathways on a substrate.

The present invention describes compositions comprising polyaniline and carbon nanotubes that exhibit electronic conductivities of ca. $10^2$ S/cm while retaining the desirable chemical stability and solution processibility of polyaniline. The compositions of the present invention are highly suitable for preparation as coatings deposited in solution/dispersion form on substrates. In a preferred embodiment, the so-deposited coating is employed as a thermal image transfer medium, enabling the formation thereby of conductive pathways in electronic circuits.

In the practice of the present invention the emeraldine form of PANI, wherein the PANI is made up of alternating units of the oxidized and reduced form of the monomer, as described in detail in Chiang et al, op. cit., is treated according to the method of Chiang et al with a protonic acid to form a nitrogen base salt. According to one method, the water-insoluble emeraldine base is dispersed in an aqueous protonic acid such as HCl, followed by drying to form a conductive powder. However, it is preferred to combine the emeraldine base with a liquid organic acid, such as dodecylbenzenesulfonic acid (DBSA), to form an organic salt which is soluble in common solvents such as toluene, xylene, and other aromatic solvents. In order to achieve a high level of conductivity, the emeraldine base should be combined with liquid acid at a temperature of 80–150° C. In the case in which the acid is in molar deficit all acid becomes consumed in the protonation of the PANI base units and the system is thus composed of protonated and unprotonated PANI constitutional units. In contrast with acid in molar excess, all PANI base becomes protonated and the mixture is composed of the protonated PANI and excess acid. An excess of acid promotes solubility but may have deleterious effects on electronic properties.

One of skill in the art will appreciate that the unexpected effects and benefits of the present invention may not be realized with every protonated PANI, however formed. It is found in the practice of the present invention that certain protonated PANI compositions are highly effective while others are ineffective, as shown hereinbelow in the specific embodiments hereof.

Both single-walled and multi-walled nanotubes are known in the art, and either is suitable for the practice of the present invention. Furthermore, the caps present at the ends of the tubes may be reduced by treatment with oxidizing acids (Tsang et al. *Nature*, 372, (1994) 1355) such as nitric acid, which inevitably creates surface acid sites which are used to protonate the PANI. There are several methods employed in the art for producing nanotubes. Regardless of the method employed, it is preferred that the carbon nanotubes be relatively free of contaminating matter. Purities of over 90% by weight are preferred. Single-walled nanotubes are preferred.

One of skill in the art will understand that the exact concentration of nanotubes needed to achieve the requisite increase in conductivity will depend, among other things, on the degree to which the PANI has been converted to the nitrogen base salt, the particular nanotubes employed, and the target conductivity. In the composition of the invention, a concentration of nanotubes between 0.5% and 30% by weight is suitable with a concentration between 1% and 10% preferred, with 1% to 5% most preferred. At concentrations below 0.5% little practical increase in conductivity is anticipated. Concentrations above 30% are expected to adversely affect the physical properties of the composite. Nanotubes are expensive, at present; it is not desirable to employ more than the minimum number of nanotubes needed to achieve the desired enhancement of conductivity.

It has been found satisfactory in the practice of the invention to form the composite of the invention by dissolving the nitrogen base salt of an organic acid such as DBSA or DNNA in an aromatic solvent such as toluene or xylene at a concentration of ca. 5–15% by weight and then mixing the solution with a dispersion of carbon nanotubes in the same or a miscible second solvent. The concentration of nanotubes in the dispersion is ca. 0.5–10% by weight. The weight ratio of nanotubes to polymer in the composite may be controlled by simply controlling the relative amounts of the solution and dispersion employed. The dispersion of nanotubes has been found to achieve satisfactory homogeneity after being subject to ultrasonic agitation for 10 to 30 minutes, preferably 20 minutes at room temperature. After the nanotube dispersion and polymer solution are combined, they are subject to ultrasonic agitation for 2.5 to 10 minutes, preferably 5 minutes. After mixing, the dispersion so formed can then be cast onto a substrate using any conventional method known in the art. A preferred method is to spread the mixture onto a substrate such as a polyester film and to use a doctor blade to produce a coating of uniform thickness. The coating is then subject to vacuum extraction to remove the solvent, leaving behind a solid coating of the composite of the invention.

One particularly preferred use of the composite of the present invention is as a conductive pathway in electronic circuits, said conductive pathway being produced by laser thermal transfer imaging. In laser thermal transfer imaging a donor element is used to transfer an image onto a receiver element upon exposure of the donor element to a sequence of laser pulses describing a pattern which imparts to the transferred image the desired form and resolution.

The donor element is a layered structure comprising a support layer, preferably a flexible support layer, a heating layer, and a transfer layer. In one embodiment, the support layer is sputter-coated with a thin layer of metal, which in turn is solution coated with a layer of the PANI/NT composite of the present invention.

In use, the thin metal heating layer absorbs incident laser radiation converting it into heat thereby causing the partial decomposition of any organic matter proximate to the point of laser incidence which, in turn, propels the PANI/NT layer onto a receiver substrate. The organic matter may include the polymeric substrate, an optional separate organic "ejection layer" specifically selected for its rapid decomposition into gaseous by-products and the PANI/NT transfer layer itself. It is the decomposition of portions of the organic matter proximate to the heating layer that produces rapidly expanding gaseous low molecular weight components which provide the propulsive force to propel the adjacent portion of the PANI/NT layer to the receiving element. The laser can be scanned across the coated surface of the donor element, turned on and off according to a preprogrammed pattern, thereby forming a high precision image on the receiving surface.

Laser thermal ablation transfer imaging is well-known in the art of color proofing and printing, as described, for example, in Ellis et al, U.S. Pat. No. 5,171,650, which is herein incorporated by reference to the entirety. It is a completely surprising result that the method of Ellis et al can be adapted in its entirety to the production of conductive polymer pathways by substituting the PANI/nanotube composite of the present invention for the pigmented layer in Ellis et al. In the present invention, a donor element comprises a support substrate (i), a layer capable of partially absorbing a high power pulse of laser radiation and rapidly converting said absorbed laser radiation to heat within the confines of a sufficiently small area so as to effect the transfer of an image of acceptable resolution onto the receiving surface (ii), an imaging topcoat (iii) essentially coextensive with said radiation absorbing layer, said imaging topcoat (iii) comprising the highly conductive PANI/nanotube composite of the present invention. In a second embodiment, a specially tailored optional organic ejection layer is also included in order to enhance the speed and precision of the response to the laser pulse.

In the practice of the invention said radiatively absorbing layer (ii) absorbs incident laser energy which is applied at a rate sufficient to transfer the carrier topcoat (iii) to a receiving surface, and is applied within sufficiently narrow confines that the image formed on the receiving surface is of sufficient resolution for the intended purpose. Resolution of 1 micrometer is readily achievable by this method.

For the laser beam to heat, the incoming radiation must be adsorbed. The optical absorption of the metal layer is critical. If the metal layer is too thick it reflects the incident radiation; if it is too thin it transmits the radiation. There is an optimum thickness for maximum absorption of the incoming radiation. This is determined by the dielectric constant of the specific metal layer at the laser wavelength. In the practice of the invention, a thickness of ca. 10 nanometers of Ni has been found to be satisfactory.

The receiving surface is in direct and intimate contact with the imaging topcoat of the transfer medium.

In the practice of the invention, Mylar® polyester film has been found to be a satisfactory substrate for the laser thermal transfer medium of the invention. Other suitable substrates will include polyvinylchloride, polypropylene and polyethylene. There are no particular limitations on the substrate except that they must be polymeric and transparent to the incident laser radiation.

Satisfactory results can be achieved without a separate organic ejection layer, utilizing only a support layer, a heating layer, and a PANI/NT transfer layer, wherein the interface at the heating layer is partially decomposed to form the gaseous decomposition products necessary to propel the PANI/NT. However, a separate organic ejection layer is preferred.

Polymers, especially polymers having a decomposition temperature below that of the PANI/NT composite, are preferred for use in the organic ejection layer which is preferred in the practice of the invention. Suitable polymers include polycarbonates such as polypropylene carbonate; substituted styrene polymers such as poly(alpha-methylstyrene); polyacrylate and polymethacrylate esters, such as polymethylmethacrylate and polybutylmethacrylate; cellulosic materials such as cellulose acetate butyrate and nitrocellulose; polyvinyl chloride; poly(chlorovinyl chloride); polyacetals; polyvinylidene chloride; polyurethanes with decomposition temperatures of about 200° C.; polyesters; polyorthoesters; acrylonitrile and substituted acrylonitrile polymers; maleic acid resins; and copolymers of the above. Mixtures of suitable polymers can also be used. Preferred polymers for the ejection layer are polyacrylate and polymethacrylate esters, nitrocellulose, poly(vinyl chloride) (PVC), and chlorinated poly(vinyl chloride) (CPVC). Most preferred are poly(vinyl chloride) and chlorinated poly(vinyl chlorideIt is in some instances satisfactory to employ the polymeric ejection layer as the support layer as well, thereby eliminating an entire layer in the structure of the donor element; however it is preferred to use two different layers. While the best arrangement will vary depending upon the exigencies of the specific application, in general the total thickness of the ejection layer and support layer should be in the range of 1–3 micrometers. When a separate support layer is employed, an ejection layer of less than 25 micrometers is satisfactory, but there needs to be enough to provide adequate ablation of the PANI/NT layer (the ablated region is 0.2–0.3 microns).

Other materials can be present as additives in the ejection layer as long as they do not interfere with the essential function of the layer. Examples of such additives include plasticizers, coating aids, flow additives, slip agents, antihalation agents, antistatic agents, surfactants, and others which are known to be used in the formulation of coatings. In the embodiments of the invention wherein such additives are desirable, it is particularly preferred that there be an ejection layer which is distinct from the PANI/NT composite itself.

The heating layer preferably absorbs 20–40% of the incident laser radiation, and is capable of sustaining an extremely rapid rise in temperature at the point of incidence of the laser pulse. In a preferred embodiment the heating layer is deposited on the flexible ejection layer. Materials suitable for the heating layer can be inorganic or organic and can inherently absorb the laser radiation or include additional laser-radiation absorbing compounds. Inorganic materials are preferred.

Suitable inorganic materials include transition metals, metals, and non-metals, including elements of Groups IIIa, IVa, Va, Via, VIII, IIIb, and Vb of the periodic table of elements, their alloys with each other, and their alloys with the elements of Groups Ia and IIa. Carbon is a suitable non-metal. Metals are preferred. Preferred metals include Al, Cr, Sb, Ti, Bi, Zr, Ni, In, Zn, and their oxides, suboxides and suitable alloys. More preferred are Al, Ni, Cr, Zr and C. Most preferred are Al, Ni, Cr, and Zr.

The thickness of the heating layer is generally about 20 Angstroms to 0.1 micrometer, preferably about 50 Angstroms for Al and 80 Angstroms for Cr. The specific thickness of the metal layer is chosen based on that providing the maximum absorption at the laser wavelength. Therefore, the metal thickness is dependent on the specific dielectric constant of each metal.

Although it is preferred to have a single heating layer, it is also possible to have more than one heating layer, and the different layers can have the same or different compositions, as long as they all function as described above. The total thickness of all the heating layers should be in the range given above, i.e., 20 Angstroms to 0.1 micrometer.

The heating layer(s) can be applied using any of the well-known techniques for providing thin metal layers, such as sputtering, chemical vapor deposition, and electron beam deposition.

The PANI/NT composition of the present invention is deposited upon the metallic coating preferably by solution casting from toluene or xylene, applied via a Meyer rod, to a dried film thickness ranging from 0.3 to 3 microns, preferably 1 micrometer.

The donor element thus formed is positioned on the receiving surface, the PANI/NT coating being directly in contact to the receiving surface. The opposite surface of the donor element is then subject to laser irradiation in a pattern of pulses which causes the ejection of PANI/NT from the transfer medium and onto the receiving substrate in the desired pattern. Suitable laser irradiation includes infrared diode laser irradiation in the wavelength range of 780 nm to 850 nm at incident fluences of 100 mJ/cm2 to 400 mJ/cm2 delivered in a pulse of about 1 microsecond duration. Incident laser fluence must be sufficiently high to effect ejection of a PANI/NT "pulse" but not so high that degradation of the PANI/NT material is initiated Suitable receiving surfaces include polymethacrylate and polymethacrylate co-polymer. Typical coatings of the receiver are copolymers of methyl methacrylate, butyl methacrylate and glycidyl metacrylate, styrene and polycaprolactone coated onto a polyester substrate or can be free standing.

In a preferred embodiment, the patterned layer of PANI/NT is used as source and drain of a plastic transistor wherein the semiconducting, dielectric and gate will be sequentially deposit to complete the circuit.

The present invention is further described according to the following specific embodiments.

EXAMPLE 1

The PANI-DBSA material was supplied by UNIAX Corporation (Santa Barbara, Calif.) in a 9% solids solution in toluene. Single wall carbon nanotubes, manufactured by pulsed laser vaporization of a metal/carbon target in a furnace at 1100° C., were purchased from Rice University. The nanotubes were purified to greater than 90% purity by rinsing in nitric acid, water and toluene. The main impurity was leftover Ni/Co catalyst particles. The carbon nanotubes ranged between 0.2 and 2 microns in length.

The nanotubes were dispersed in toluene at 1.43% by weight. The carbon nanotubes slurry was prepared by adding 0.286 g of carbon nanotubes and 19.714 g of Toluene into a 2 oz container. The mix was then subject to ultrasonic agitation for 20 minutes while maintaining a vortex in the slurry. Appropriate amounts of the slurry were added to the specific amount of 9% Pani/DBSA solution needed to achieve the desired nanotubes concentration in the dry film, and the mixture subject to ultrasonic agitation for 5 minutes. The amounts of slurry and DSBA/PANI solutions were adjusted as follows to give the desired nanotube

TABLE 1

Example 1 Specimens

| Specimen | Weight of 9% DSBA/PANI | Weight of 1.43% Nanotube slurry in Toluene | % Nanotubes in dry film |
|---|---|---|---|
| Control | 10 | 0 | 0 |
| Specimen 1A | 11.0834 | 0.1748 | 0.25 |
| Specimen 1B | 11.055 | 0.3496 | 0.5 |
| Specimen 1C | 11.0277 | 0.5244 | 0.75 |
| Specimen 1D | 11.000 | 0.6993 | 1.00 |
| Specimen 1E | 10.972 | 0.8741 | 1.25 |
| Specimen 1F | 10.944 | 1.0489 | 1.50 |
| Specimen 1G | 10.916 | 1.2237 | 1.75 |
| Specimen 1H | 10.888 | 1.3986 | 2.00 |

These dispersions were coated onto 2"×3" glass microscope slides using a #4 Meyer rod which are well known in the art for hand coating films from solution and dried in air in an oven at 60° C. for 45 seconds. The coated area was 1"×2" and the film thickness around 4 microns. Thickness was determined by optical interferometry.

A line of four 1/16" by 3" 4000 Å thick silver contacts 0.25" apart were sputtered through an aluminum mask on to the thus prepared film using a Denton vacuum unit (Denton Inc. Cherry Hill, N.J.). The film resistivity was measured using the standard 4-probe measurement technique in which a current is applied to the two outer contacts and the voltage across the two inner contacts is determined. The current was supplied by a Hewlett Packard 6234A dual output power supply and was measured using an electrometer (Keithley 617). The voltage was measured at the two inner contacts using a Keithley miltimeter. The resistivity, ρ, was calculated as:

$$\sigma = \frac{1}{\rho} = \frac{i \times d}{V \times A}$$

Where ρ is the resistivity in (ohm-cm), V is the voltage measured at the inner contacts, i is the current at the 2 outer contacts, d is the separation between the inner contacts, and A is the cross-sectional area of the film determined from the product of the distance between the outer contacts and the film thickness. The conductivity for each film is shown in Table 2 and depicted graphically in FIG. 1.

TABLE 2

| Specimen | NT conc | σ (S/cm) |
|---|---|---|
| Control | 0 | 0.00018 |
| Specimen 1A | 0.25 | 0.00025 |
| Specimen 1B | 0.5 | 0.00017 |
| Specimen 1C | 0.75 | 52 |
| Specimen 1D | 1 | 62 |
| Specimen 1E | 1.25 | 62.539 |
| Specimen 1F | 1.5 | 39 |
| Specimen 1G | 1.75 | 36.7 |
| Specimen 1H | 2 | 44 |

COMPARATIVE EXAMPLE 1

A 2.60 wt. % solution of the conducting polyaniline use in this example was prepared by mixing 14.36 g mixed xylenes (EM Science, purity: 98.5%) to 0.9624 g XICP-OSO1, a developmental conductive polyaniline solution obtained from Monsanto Company. XICP-OSO1 contains approximately 48.16 wt. % xylenes, 12.62 wt. % butyl cellosolve, and 41.4 wt. % conductive polyaniline wherein the nitrogen base salt was prepared by treating the PANI with dinonylnaphthalenic acid (DNNA).

Nanotubes were dispersed in turpinol at 1.43% by weight. The nanotube/turpinol mixture was subject to ultrasonic agitation for 24 hours at ambient temperature prior to mixing with the 41.4% solution of XICP-OSO1. PANI-XICP-OSO1/NT dispersions were made at ratios to give nanotube/total solids concentration ratios 0, 0.25, 0.5, 0.75, 1, 1.25, 1.5, 1.75, 2, 4, 6, 10, 20 and 40% were coated onto 2"×3" glass microscope slides and dried in air at 60° C. for 30 seconds.

The coated area was 1"×2". Film thickness was determined by optical interferometry. Silver contacts for resistivity measurements were sputtered to 4000 Å in thickness through an aluminum mask using a Denton vacuum unit (Denton Inc. Cherry Hill, N.J.). The film resistivity was determined according to the method of Example 1. The resistivity versus nanotube concentration is shown in Table 3.

TABLE 3

| Specimen | NT conc. (%) | σ (S/cm) |
|---|---|---|
| Control | 0 | 0.000306 |
| Specimen CE1A | 0.25 | 0.00048 |
| Specimen CE1B | 0.5 | 0.0068 |
| Specimen CE1C | 0.75 | 0.015 |
| Specimen CE1D | 1 | 0.114 |
| Specimen CE1E | 1.5 | 0.3698 |
| Specimen CE1F | 2 | 1.31 |
| Specimen CE1G | 2.5 | 1.27 |
| Specimen CE1H | 4 | 1.53 |
| Specimen CE1I | 6 | 1.08 |
| Specimen CE1J | 8 | 1.9 |
| Specimen CE1K | 10 | 1.87 |
| Specimen CE1L | 20 | 3.37 |
| Specimen CE1M | 40 | 27.53 |

EXAMPLE 2

Laser thermal ablation transfer was employed to create an electronic circuit component with a PANI/nanotube composition.

A donor layer was formed by coating a 10 nanometer thick layer of metallic nickel onto 400D Mylar® by electron-beam deposition. The thus formed Ni layer exhibited 35% optical transmission at a wavelength of 830 nm. A transfer layer was formed by coating the thus formed Ni layer with a 1 micrometer thick layer of the composition of Comparative Example 1 designated CE1J using a #4 Meyer rod.

The receiving layer consisted of a 1 micrometer thick layer of polythiophene coated onto 400D Mylar® from a 2% solids solution in toluene with a #4 Meyer rod. The coating was air dried for 30 minutes.

Figure 2:
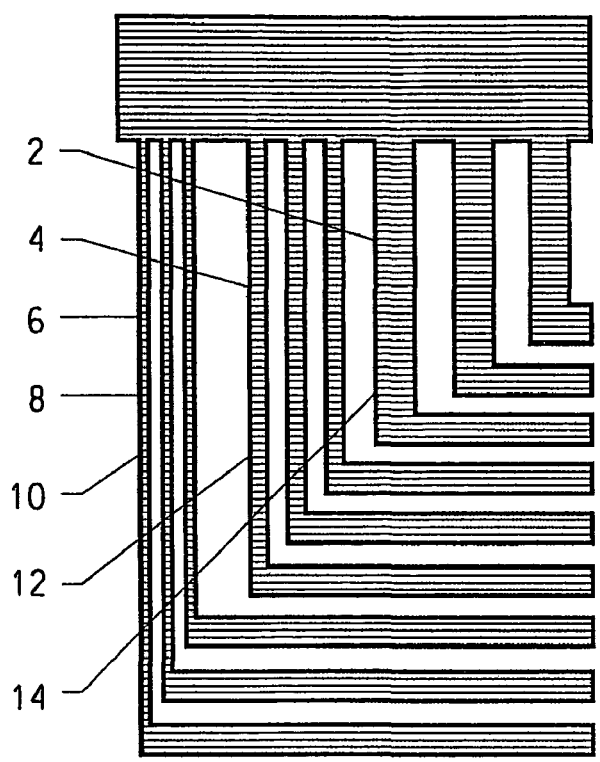
FIG. 2 is a pixelated image generated using computer aided software. The image was translated into a pattern of pixels as further described herein.

The image shown in FIG. 2 was generated using computer aided design software. The image was translated into a pattern of pixels which were designated either "on" or "off" to correspond respectively to activation and deactivation of the laser to be employed for image transfer.

The images were obtained using a Spectrum CREO Trendsetter with 5080 DPI resolution (CREO-Scitex, Vancouver, Canada) equipped with a Spectrum Trendsetter Exposure Unit comprising a 20 watt infrared diode laser emitting 1 microsecond pulses at a wavelength of 830 nanometers. The Spectrum CREO Trendsetter comprised an 81.2-cm long drum having a perimeter of 91 cm. The receiver and donor elements were loaded into separate cassettes which is placed into the unit. Prior to exposure the receiver was automatically loaded from the cassette onto the drum and held by vacuum. The donor, slightly larger than the receiver, was then automatically loaded from the cassette and positioned directly on top of the receiver and held by vacuum at all four edges.

The pixelated image of FIG. 2 was loaded into the control computer of the CREO unit, and the donor was then exposed according to the programmed pattern with the desired pattern. To form the image, the laser beam was split by a light valve to form an array of 240 5×2 micrometer overlapping pixels. The laser head was translated along the drum and each pixel was turned on or off to form the image. The laser fluence was adjustable 7 Watts and the drum speed was 150 RPM. The scale of FIG. 2 is 5 cm in width and 9 cm in height. Five mm gates are shown at (2), 2 mm gates are shown at (4) and 1 mm gates are shown at (6). Twenty μ channels are shown at (8). A 1 mm wide source is shown at (10); a 2 mm wide source is shown at (12) and a 5 mm wide source is shown at (14).

Figure 3:
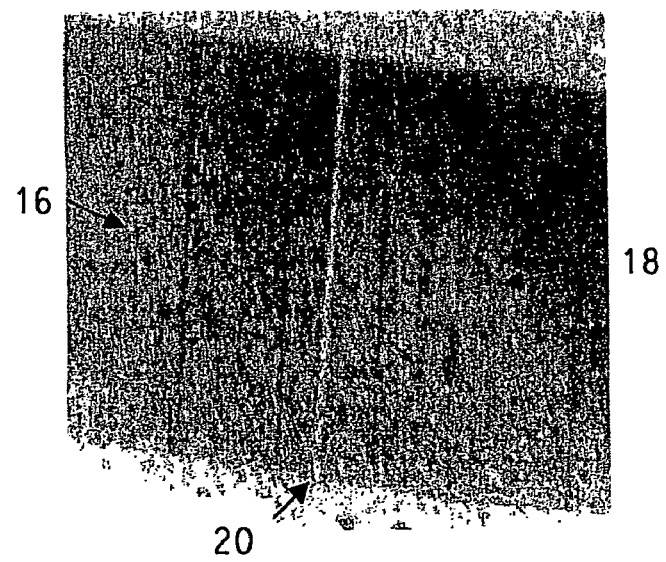
FIG. 3 represents an image showing a close-up of source and drains and an intervening channel.

After exposure the image of FIG. 2 had been transferred to the receiver in the form of a PANI/nanotube "ink". FIG. 3 is an image showing a close-up of a source (16), drain (18), and intervening channel (20). The channel (20) was 20 micrometers wide, as shown.

What is claimed is:

1. An electronic circuit comprising one or more conductive pathways of a nitrogen base salt derivative of emeraldine polyaniline and carbon nanotubes dispersed within the polyaniline.

2. The composition of claim 1 wherein the nanotubes are single-walled.

3. The composition of claim 1 wherein the nanotubes are multi-walled.

* * * * *